United States Patent [19]

Takeuchi

[11] Patent Number: 5,062,787
[45] Date of Patent: Nov. 5, 1991

[54] ROTARY TYPE INJECTION ORIENTATION BLOW MOLDING MACHINE

[75] Inventor: Setsuyuki Takeuchi, Toguramachi, Japan

[73] Assignee: A.K. Technical Laboratory, Inc., Japan

[21] Appl. No.: 605,989

[22] Filed: Oct. 30, 1990

[30] Foreign Application Priority Data

Oct. 30, 1989 [JP] Japan .................................. 1-282807

[51] Int. Cl.$^5$ ........................................... B29C 49/06
[52] U.S. Cl. .................................... 425/522; 425/533; 425/534
[58] Field of Search ............... 425/533, 534, 541, 522, 425/537, 540

[56] References Cited

U.S. PATENT DOCUMENTS

| | | | |
|---|---|---|---|
| 4,457,689 | 7/1984 | Aoki | 425/533 X |
| 4,726,756 | 2/1988 | Aoki | 425/534 X |
| 4,731,011 | 3/1988 | Nakamura et al. | 425/534 X |
| 4,941,816 | 7/1990 | Aoki | 425/534 X |
| 4,946,367 | 8/1990 | Nakamura | 425/534 X |

FOREIGN PATENT DOCUMENTS

53-22096 7/1978 Japan ................................... 435/534

Primary Examiner—Richard L. Chiesa
Attorney, Agent, or Firm—Ostrolenk, Faber, Gerb & Soffen

[57] ABSTRACT

A rotary type injection orientation blow molding machine. A horizontal plate is vertically movably provided on a machine bed with portions of a peripheral edge thereof inserted into tie bars standing upright on the machine bed. A transfer plate is rotatably mounted on the underside of the base plate and has hold molds at these locations on the lower surface thereof. A drive device located in the central portion in the upper portion of the base plate intermittently rotates the transfer plate by a predetermined angle. A vertical clamping device and an injection mold with stop positons of the hold molds serve as an injection molding portion, an orientation blow molding portion and a releasing portion, respectively, a blow mold and orientation blow device, and a releasing device.

3 Claims, 7 Drawing Sheets

ROTARY TYPE INJECTION ORIENTATION BLOW MOLDING MACHINE

BACKGROUND OF THE INVENTION

1. Field of the Invention

This invention relates to a rotary type injection orientation blow molding machine which can perform operations from injection molding of a preform formed of a synthetic resin to orientation blow molding of a hollow molded article.

2. Description of the Prior Art

The molding machines of this kind include one type in which a rotary disk on the machine bed is held by a base plate secured by a tie bar, and an injection mold is moved with respect to a hold mold on the lower side of the rotary disk to effect clamping, and include another type in which a mold is fixed, and a base plate is moved together with a rotary disk to effect clamping.

In the molding machine of the base plate-fixed type, since the injection mold is vertically moved, the injection apparatus cannot always be placed in nozzle touch with the mold, and it is necessary to move the injection apparatus backward after every completion of injection. Therefore, it takes time for the injection molding, which comprises a bottleneck in improving the molding cycle. Furthermore, both the injection core and mold need be clamped, as a consequence of which a larger clamping device is required.

On the other hand, in the molding machine of the base plate movable type, since the injection mold is fixed, the aforementioned problem can be overcome. However, it is necessary to move the clamping plate provided with the injection core up and down so as not to be delayed in the movement of the base plate, and the moving stroke thereof is larger than in the case of the fixed type. Therefore, it takes time for open and closing the mold, which comprises a bottle-neck in shortening the molding cycle.

OBJECT OF THE INVENTION

This invention has been contemplated in view of the above. An object of the invention to provide, in a molding machine of the type in which the base plate side is moved, a new rotary type injection orientation blow molding machine capable of vertically moving the clamping plate at a high speed.

SUMMARY OF THE INVENTION

According to a first feature of the present invention, there is provided a rotary type injection orientation blow molding machine in which a horizontal base plate is vertically movably provided on a machine bed with required portions of a peripheral edge thereof inserted into tie bars stood standing upright on the machine bed, a transfer plate rotatably mounted on the underside of said base plate and having hold molds at three locations of the lower surface thereof, a drive device located in the central portion in the upper portion of the base plate to intermittently rotate the transfer plate by a predetermined angle, a vertical clamping device and an injection mold with stop positions of said hold molds serving as an injection molding portion, an orientation blow molding portion and a releasing portion, a blow mold and orientation blow device, and a releasing device are provided at predetermined locations on the machine bed or the base plate, wherein a frame for connecting upper ends of said tie bars with each other and a fixed plate downwardly having a clamping cylinder of said clamping device are integrally molded, said fixed plate being secured to the tie bars on both sides of the injection molding portion, a clamping ram is connected to a vertically movable clamping plate inserted into both the tie bars, and a base-plate vertically moving cylinder is provided between a beam member integrally mounted between said machine bed and a peripheral edge of the base plate or between the frame of the tie bars and the fixed plate of the clamping device, and a cover member for the drive device in the central portion of the base plate.

According to a second feature of the present invention, said clamping device comprises a clamping cylinder wherein an inner diameter of an upper chamber is larger than an inner diameter of a lower chamber, the lower chamber is communicated with a parallel charge cylinder on the side of the cylinder and both the chambers are communicated by a bypass provided with a closing valve; a booster ram extended through a central portion of the clamping cylinder, a cylindrical clamping ram having a piston having an outer diameter matched to said lower chamber at the upper end thereof and having said booster ram inserted thereinto, a clamping plate having an injection core at the lower side thereof and vertically movably inserted into the tie bars on the both sides, and a piston rod of the charge cylinder connected to the clamping plate together with said claimping ram.

BRIEF DESCRIPTION OF THE DRAWINGS

The drawings show embodiments of a rotary type injection blow molding machine according to this invention.

DETAILED DESCRIPTION OF THE PREFERRED EMBODIMENTS

In the drawings, reference numeral 1 designates a machine bed, 2 a horizontal base plate above the machine bed, 3 a transfer plate rotatably embraced in the underside of the base plate 2, and 4 a seat plate on the machine bed.

Tie bars 5 are stand vertically upright at four portions of the seat plate 4, and peripheral edges of the base plate are slidably inserted into the tie bars 5. Insert holes are bored in three portions of the transfer plate 3, and hold molds 6 also serving as a mold forming a mouth portion of a preform are radially closeably mounted on the lower surface of the transfer plate at the portions of the insert holes.

A drive device 7 for intermittently rotating the transfer plate 3 every 120° leftwise is provided in the central portion at the upper portion of the base plate. Stop positions of the hold molds 6 of the transfer plate 2 are set to be an injection molding portion, an orientation blow molding portion and a releasing portion, respectively. Core insert portions 8 are bored, and a clamping device 9, an orientation blow device 10 and a releasing device 11 are disposed in order on said portions.

A fixed plate 12 of the clamping device 9 is formed integral with a frame 13 for connecting upper ends of the tie bars 5 to each other, the fixed plate 12 being mounted over the upper ends of a pair of tie bars 5 on the both sides of the injection molding portion. A clamping cylinder 14 is downwardly integrally formed at the upper portion of the fixed plate 12, and a charge cylinder 15 for pressurized oil and a bypass 16 vertically communicated within the clamping cylinder are provided on both sides thereof.

The inner diameter of the upper chamber of the clamping cylinder is larger than the inner diameter of the lower chamber, the lower chamber being communicated with the charge cylinder 15, and a booster ram 18 having a piston inserted into a cylindrical clamping ram 17 is positioned in the central portion therein. A piston 19 of the clamping ram 17 has the outer diameter watertightly fitted into the lower chamber, and the clamping ram 17 is moved downward due to the pressurized oil within the cylinder according to a difference in pressure receiving area between the upper surface and lower surface of the piston.

Figure 3:
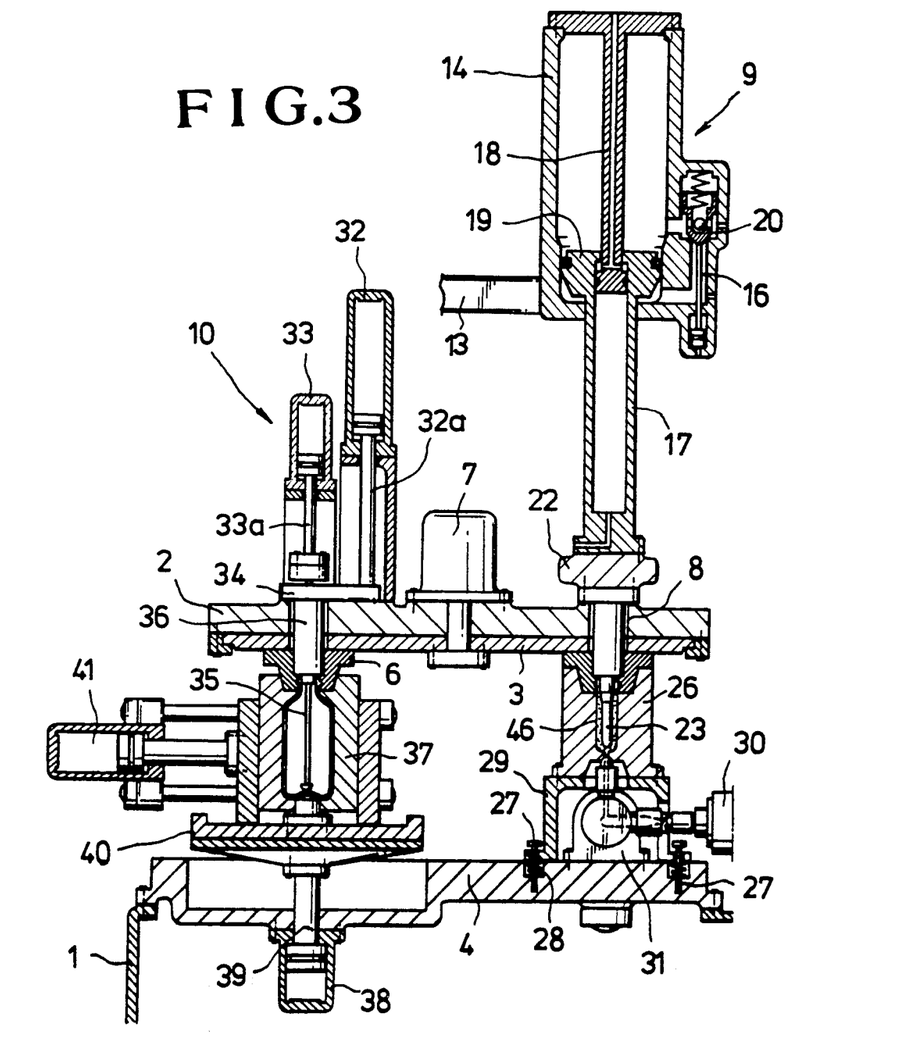
FIG. 3 is a longitudinal sectional side view of an injection molding portion and an orientation blow molding portion during molding.
Figure 4:
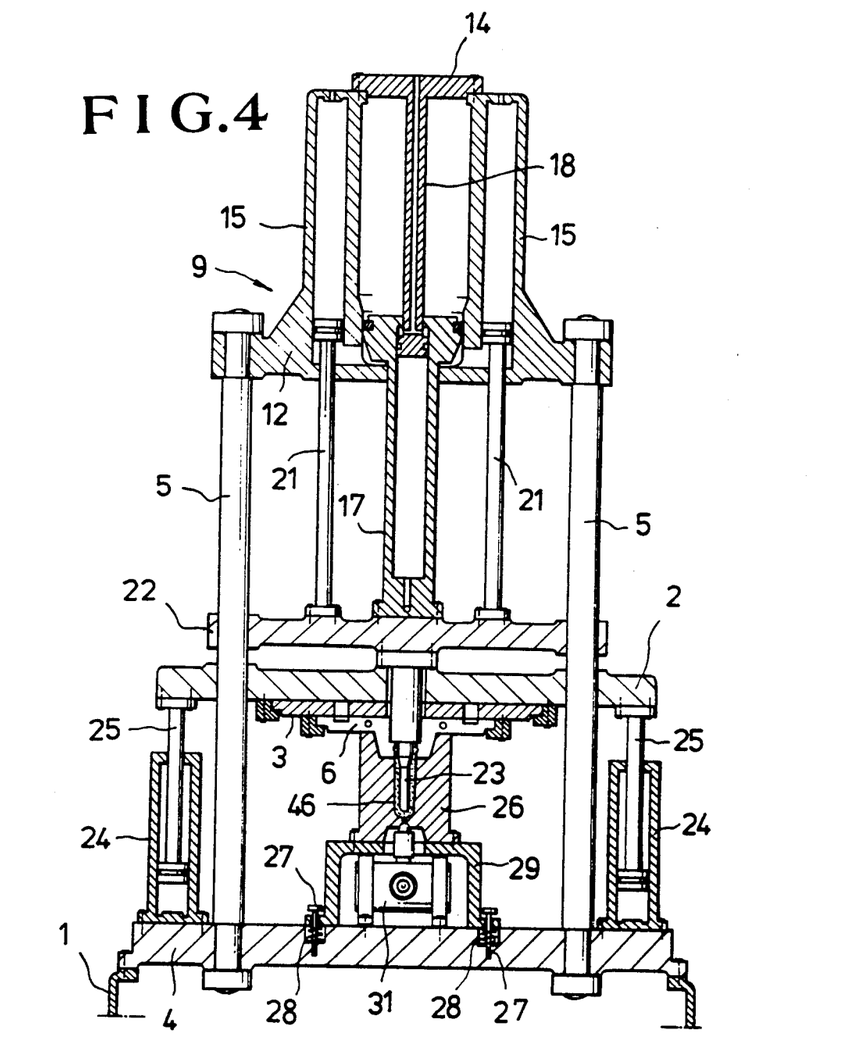
FIG. 4 is a longitudinal sectional front view of the injection molding portion.
Figure 5:
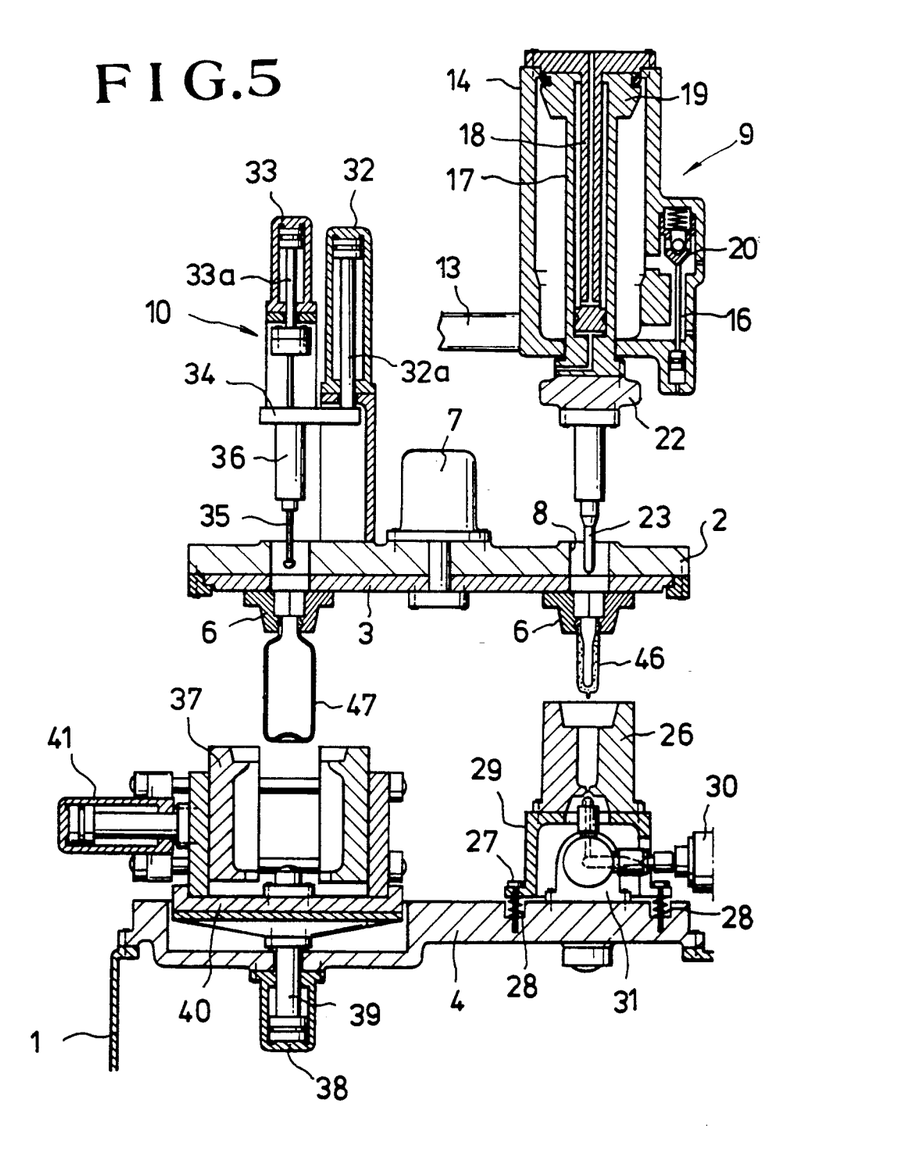
FIG. 5 is a longitudinal sectional side view of an injection molding portion and an orientation blow molding portion when the mold is opened.
Figure 6:
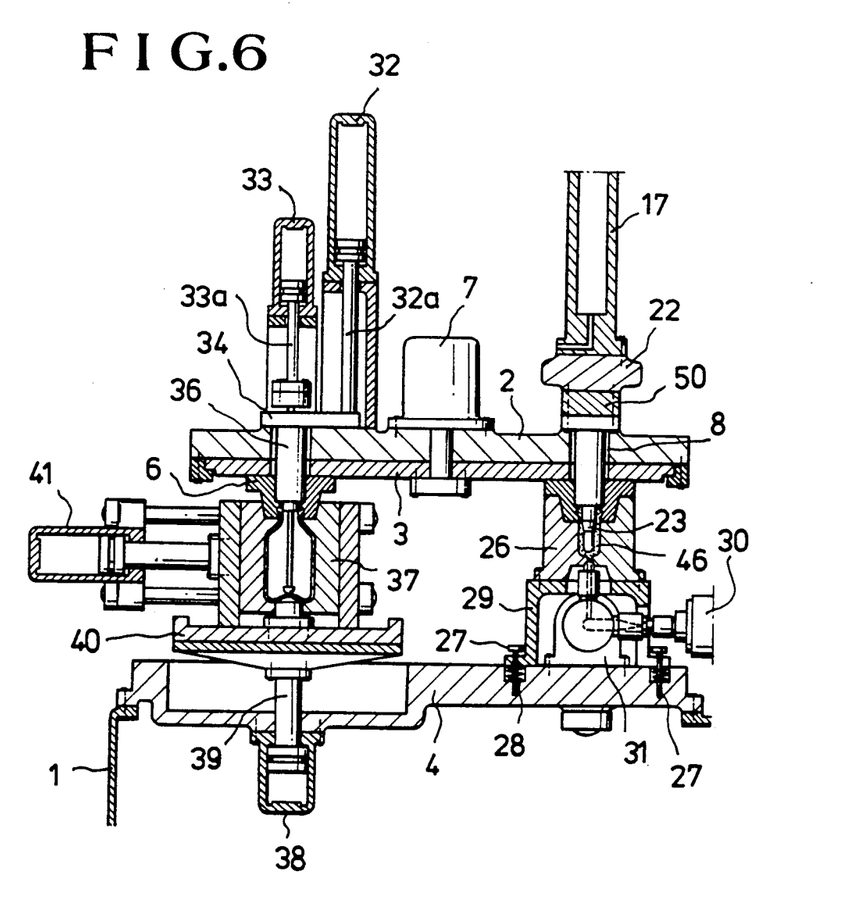
FIG. 6 is a longitudinal sectional side view of an injection molding portion and an orientation blow molding portion during molding according to another embodiment.

The bypass 16 is interiorly provided with a valve 20 which defines upper and lower supply and discharge ports connected to a hydraulic circuit (not shown) if necessary and which opens and closes the bypass (see FIG. 3).

The clamping cylinder 17 and a pair of piston rods 21 of the charge cylinder 15 on the both sides are connected to a clamping plate 22 vertically movably inserted over both the tie bars 5, and an injection core 23 is mounted on the underside of the clamping plate 22.

Reference numeral 24 designates a base-plate vertically moving cylinder. The cylinders 24 are provided on a seat plate externally of the tie bar 5 of the injection molding portion and on a seat plate between the orientation blow molding portion and the releasing portion, and their piston rods 25 are connected to the edge side of the base plate 2.

Reference numeral 26 designates an injection mold, which is secured to a pedestal 29 vertically movably provided by a limit pin 27 and a spring member 28 on the seat plate 4. A lock 31 always placed in nozzle touch with an injection device 30 is secured to the seat plate interiorly of the pedestal 29.

An air or hydraulically operated core insert cylinder 32 and an orientation cylinder 33 are provided on the base plate 2 of the orientation blow molding portion 10, and a blow core 36 interiorly provided with an orientation rod 35 is mounted under a bed plate 34 having a piston rod 32a connected thereto.

A blow mold 37 is provided on the seat plate. The blow mold 37 is radially closeably provided together with a clamping cylinder 41 on a support bed 40 connected to a ram 39 of an air or hydraulically operated elevating device 38 installed underside of the seat plate.

Figure 1:
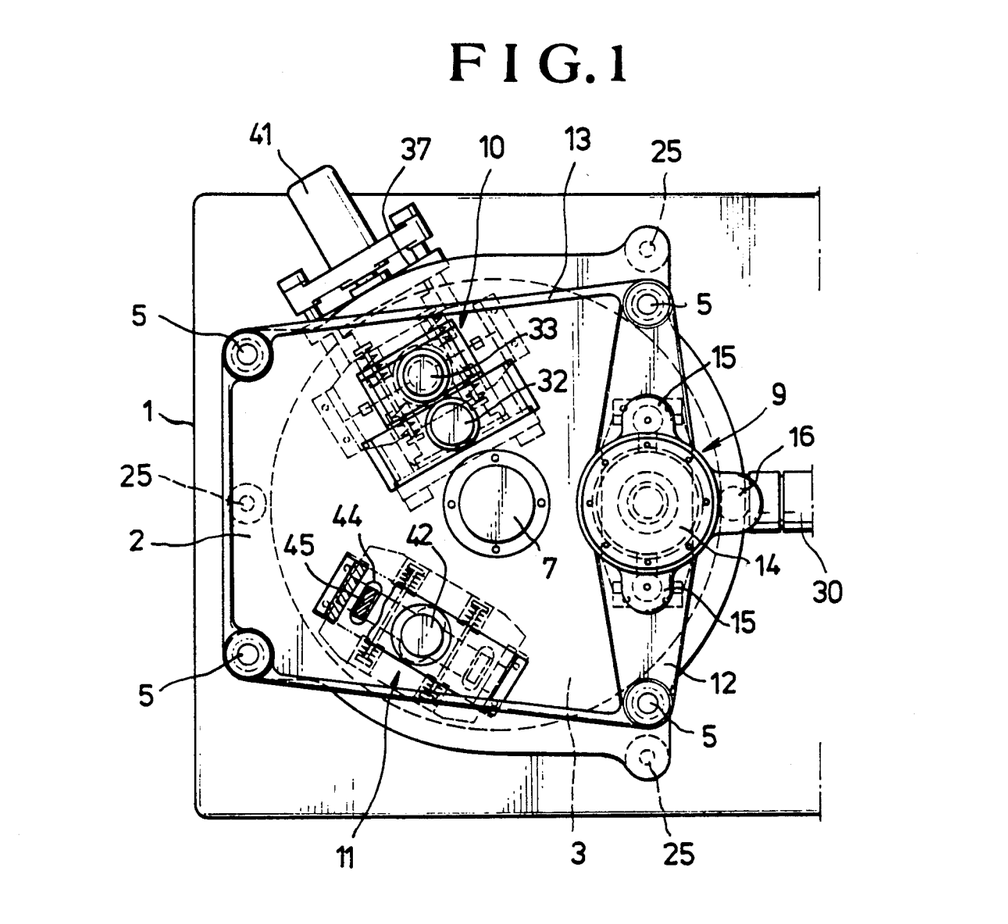
FIG. 1 is a plan view of the molding machine, a part of which is cut away.
Figure 2:
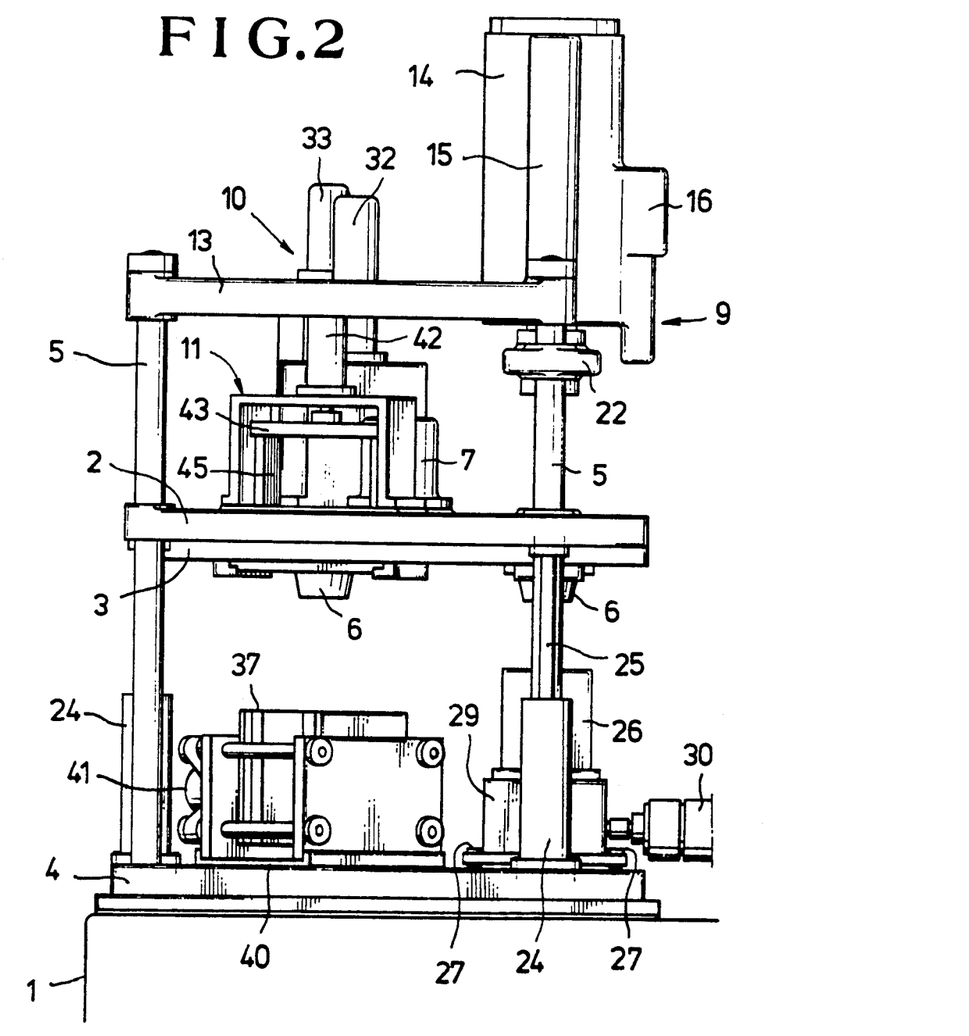
FIG. 2 is a side view when the mold is opened.

An air or hydraulically operated releasing cylinder 42 is provided on the base plate of the releasing portion 11. Wedge members 45 entered from the base plate and an opening 44 (see FIG. 1) of the transfer plate to force open the hold mold 6 are mounted on both ends of a bed plate 43 connected to a piston rod of the cylinder 42.

Reference numeral 46 designates a preform and 47 denotes a molded article.

Figure 7:
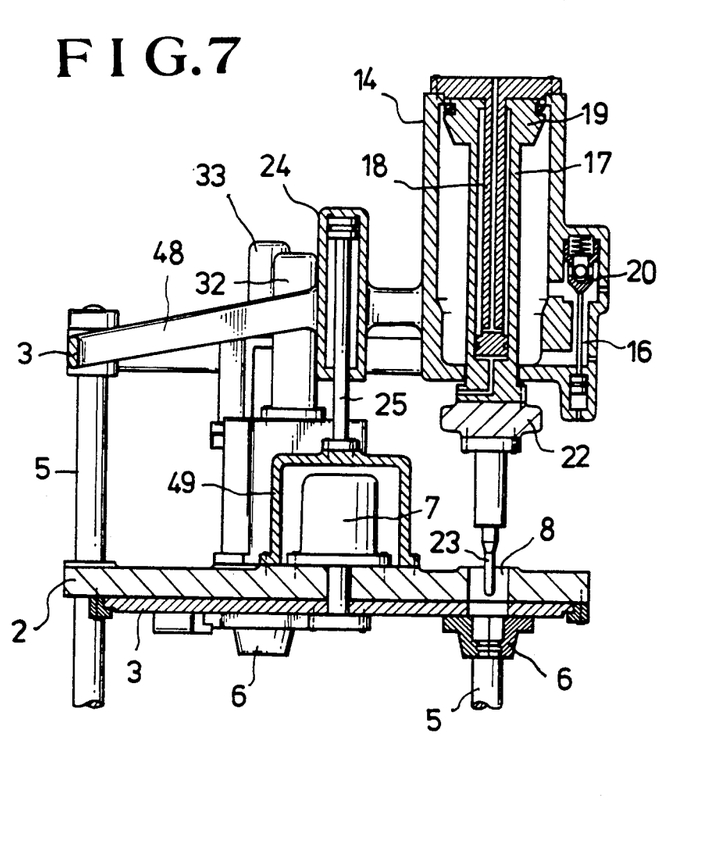
FIG. 7 is a partly longitudinal sectional side view of an upper portion of a molding machine according to still another embodiment

In an embodiment shown in FIG. 7, the base-plate vertically moving cylinder 24 is mounted on a beam member 48 integrally mounted over the frame 3 and a central portion on the fixed plate side of the clamping device 9, the piston rod 25 is connected to a cover member 48 of the drive device in the central portion of the base plate, and the base plate 2 is moved up and down in the central portion.

In the molding machine having the construction as described above, when the piston rod 25 of the baseplate vertically moving cylinder 24 is contracted, the base plate 2 together with the transfer plate 3 moves down, and in the injection molding portion, the hold mold 6 is fitted into an upper opening of the cavity of the injection mold 26. In the orientation molding portion 10, the hold mold 6 is positioned at the central portion of the blow mold 37.

When during the downward movement of the base plate 2, pressure oil is supplied from a supply port in the bypass 16 on the side to the clamping cylinder 14, the clamping ram is moved downward due to a difference in pressure received by the piston 19 to downwardly move the injection core 23 together with the clamping plate 22. Since the piston rod 21 of the charge cylinder 15 is pulled downward due to the downward movement of the clamping plate 22, pressure oil within the charge cylinder is delivered from the lower chamber to the clamping cylinder 14. Such a delivery is continued till the piston 19 is fitted into the lower chamber, and the pressure oil within the chamber is fed toward the upper chamber because of presence of a clearance around the piston 19. Therefore, even if pressure oil is present in the lower chamber, it will not act as a resistance, and the clamping ram 17 is moved down at a high speed.

When the piston 19 is fitted into the lower chamber, oil-pressure resistance is produced therein so that the descending speed of the clamping ram 17 slows down. When at that time, the bypass 16 is closed to let pressure oil in the lower chamber escape from a discharge port at the lower portion of the bypass to the hydraulic circuit, the mode is switched to clamping.

During the course of clamping, in the orientation blow molding portion 10, closing and clamping of the blow mold 37 are carried our. Then, this step is shifted to injection molding of the preform 46 and orientation blow molding of the molded article 47.

Upon completion of the molding, the blow mold 37 is opened, and a supply of pressure oil into the clamping cylinder is stopped, and when the bypass 16 is opened to supply pressure oil to the booster ram 18, the clamping ram 17 is moved upward together with the clamping plate 22 by the pressure oil fed under pressure into the clamping ram. At the same time, the piston rod 21 is also forced upward through the clamping plate 22, and therefore, pressure oil within the clamping cylinder is pumped up into the charge cylinder 15 via the bypass 16. Therefore, pressure oil in the upper chamber comprises no resistance so that the clamping ram 17 is moved upward at a high speed.

When the piston 25 of the base-plate vertically moving cylinder 24 is extended in synchronism with the upward movement of the clamping ram 17, the base plate 2 is moved upward together with the transfer plate 3 having the preform 46 held by the hold mold 6, and the injection core 13 is removed during such upward movement.

The difference in level of the injection mold 36 and the blow mold 37 can be adjusted by vertically changing the position of the blow mold 37.

In molding of a short preform 46, a moving stroke of the clamping ram 17 is restricted, and therefore, the injection core 23 is mounted by applying a block 50 having a predetermined thickness to compensate for the stroke to the clamping plate 22.

This invention has a configuration as mentioned above, and even in the case where the base plate is moved upward together with the transfer plate, mold opening can be done at a high speed. Moreover, since the injection device may be always placed in nozzle touch with the injection mold, there is a feature that the molding cycle time is materially shortened.

What is claimed is:

1. A rotary injection orientation blow molding machine comprising a machine bed, a horizontal base plate vertically movably supported above said machine bed, tie bars on said machine bed, the base plate having portions of a peripheral edge thereof which are installed on said tie bars which are standing upright on said machine bed, said base plate having an underside spaced below said machine bed, a transfer plate rotatably mounted on said underside of said base plate, said transfer plate having a lower surface and having hold molds at three locations of said lower surface thereof, said base plate having an upper portion, a drive device located in a central portion of said upper portion of said base plate to intermittently rotate said transfer plate by a predetermined angle to bring each said hold mold to a said location of said transfer plate, a vertical clamping device and an injection mold with stop positions of said hold molds serving as an injection molding portion, an orientation blow molding portion and a releasing portion, respectively, a blow mold and orientation blow device, and a releasing device provided at predetermined locations above said machine bed, said tie bars having upper ends, a frame for connecting said upper ends of said tie bars with each other, and a fixed plate downwardly having a clamping cylinder of said clamping device, said clamping cylinder being integrally molded to said fixed plate, said fixed plate being secured to said tie bars on both sides of said injection molding portion, a plurality of base plate vertically moving cylinders provided over said machine bed and at the peripheral edge of the base plate, said clamping device comprising a clamping cylinder including an upper and lower chamber wherein the inner diameter of said upper chamber is larger than the inner diameter of said lower chamber and both said chambers are communicated by a bypass provided with a closing valve, a cylindrical clamping ram extended through a central portion of said clamping cylinder, and said cylindrical clamping ram having a piston of an outer diameter matched to the diameter of said lower chamber and having a booster ram inserted therein.

2. A rotary injection orientation blow molding machine according to claim 1, wherein said lower chamber communicates with a parallel charge cylinder on the side of said clamping cylinder and both said upper and lower chambers are also communicated by said bypass provided with said closing valve, said cylindrical clamping ram having said piston having an outer diameter matched to the diameter of said lower chamber at the upper end of said piston, and a piston rod of said charge cylinder connected to said clamping plate together with said clamping ram.

3. A rotary injection orientation blow molding machine according to claim 1, wherein the base plate vertically moving cylinders are provided over a beam member integrally mounted over the frame for the tie bars and the fixed plate side of said clamping device and a cover member for the drive device in the central portion of the base plate.

* * * * *

UNITED STATES PATENT AND TRADEMARK OFFICE
CERTIFICATE OF CORRECTION

PATENT NO. : 5,062,787
DATED : November 5, 1991
INVENTOR(S) : Setsuyuki Takeuchi It is certified that error appears in the above-identified patent and that said Letters Patent is hereby corrected as shown below:

Column 5, line 30, change "below" to --above--.

Signed and Sealed this

Eleventh Day of January, 1994

*Attest:*

BRUCE LEHMAN

*Attesting Officer*     *Commissioner of Patents and Trademarks*